Jan. 26, 1954
J. K. POCKNEE
2,667,067
HARDNESS TESTING INSTRUMENT
Filed March 18, 1952
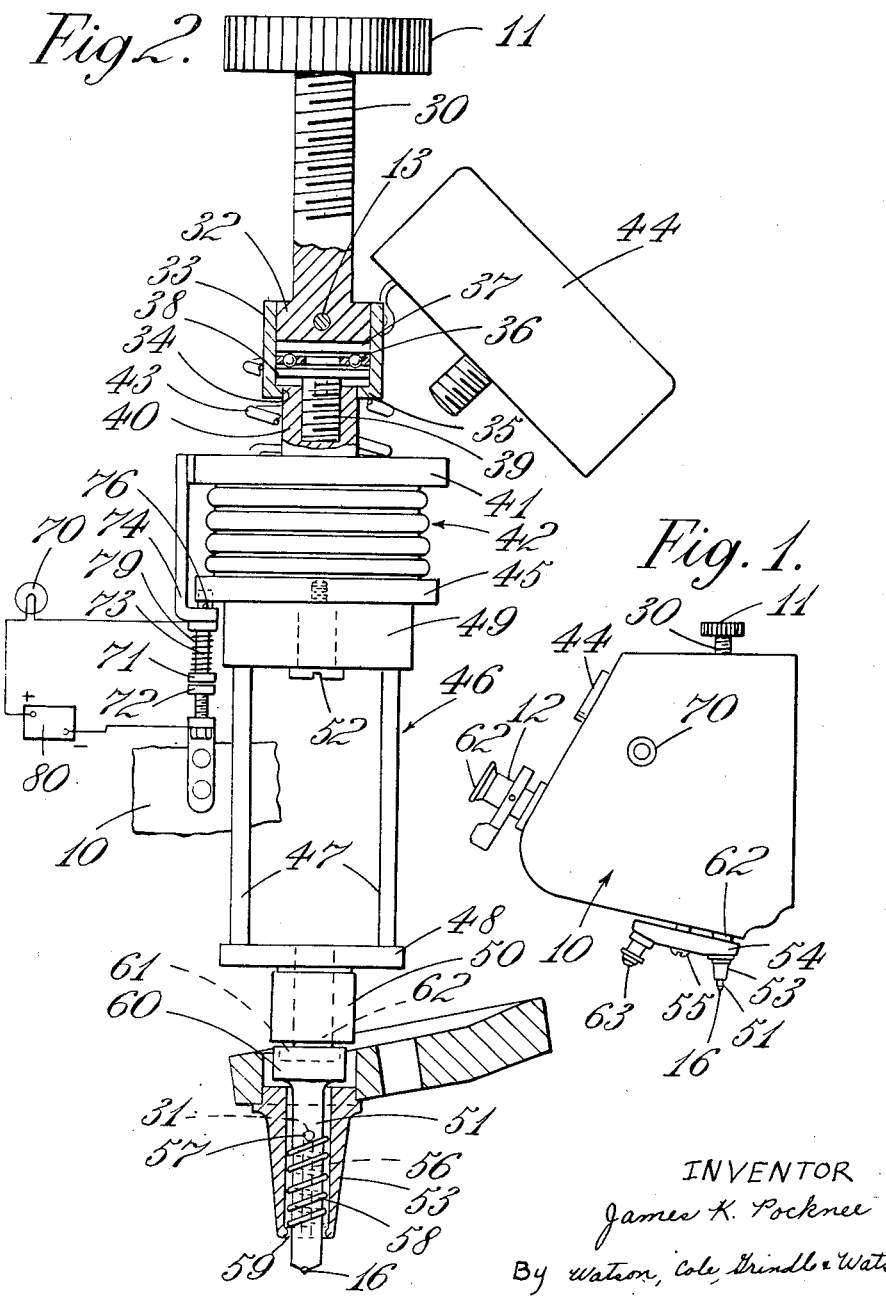
INVENTOR
James K. Pocknee
By Watson, Cole, Grindle & Watson
ATTORNEYS Patented Jan. 26, 1954

2,667,067

UNITED STATES PATENT OFFICE 2,667,067

HARDNESS TESTING INSTRUMENT

James Kitchener Pocknee, London, England, assignor to Cabul Tool Company Limited, London, England, a British company Application March 18, 1952, Serial No. 277,236

4 Claims. (Cl. 73—81)

The present invention relates to static hardness testing instruments of the kind wherein an indentation is formed in the surface to be tested by means of an indentor which is applied to the surface with a predetermined thrust, and the size of the indentation produced is measured by an optical measuring system incorporated in the instrument, the size of the indentation being regarded as a measure of the hardness of the test surface.

An object of the present invention is to provide an improved construction of indentor-thrust assembly for a static hardness testing instrument which allows of greater accuracy in hardness measurement than has hitherto been found possible with instruments of the kind referred to above.

Another object of the present invention is to reduce friction losses in transmitting the predetermined thrust to the indentor whereby a more accurate determination of the hardness of a test surface may be made.

In the present invention the indentor is carried by a rod which is slidably mounted in a guide for movement in the direction of its long axis to apply the indentor to the test surface, and the rod and the guide are adjustable from an operative position, at which the rod co-operates with thrust means carried by the instrument, to an inoperative position away therefrom in order that the size of the indentation may be measured. Accordingly, another object of the invention is to ensure that thrust is applied to the indentor axially of the rod, although the guide may be slightly misaligned with the thrust application means on adjustment to its operative position.

Another object of the invention is to provide means for indicating when the indentor rod is correctly seated up against the thrust means and the instrument is set for the application of the predetermined thrust.

In order that the invention may be clearly understood, and readily carried into practice, one embodiment thereof will now be described, by way of example only, with reference to the accompanying drawings whereof:

Figure 1 is a purely diagrammatic representation of a portable static-hardness testing instrument incorporating an indentor-thrust assembly according to the present invention, and Figure 2 is an elevation partly in section of the indentor-thrust assembly which forms part of the instrument shown in Figure 1.

Referring to the drawings the indentor-thrust assembly comprises a threaded spindle 30 which is received by a threaded hole in the casing of the instrument which casing (generally indicated by the reference numeral 10) constitutes a frame to carry the several parts of the assembly, as later described. The spindle 30 carries beyond the casing a pressure knob 11 (see Figure 1) by rotation of which the spindle 30 is axially adjustable relatively to the casing, such adjustment being utilised to produce a thrust which is transmitted to the indentor.

The other end of the spindle 30 of the thrust-producing means is flanged as at 32, and the flange is received within the mouth of a cylindrical housing 33 wherein it is secured by a cross-pin 13, said housing being of cup form and having a hole 34 in its end wall 35. Within the housing is a ball thrust race 36 located between a pair of thrust discs 37 and 38, disc 38 of which has a centrally placed threaded stud 39 which passes through the hole 34 and is screwed into a socket 40 carried by an end plate 41 of a flexible bellows member generally indicated at 42. The socket 40 is received with clearance in the hole 34 and in turn receives the stud 39. Spindle 30 is thus connected to member 42 by the coupling described which permits axial loading of the member 42 with rotation of the spindle. The member 42 forms a compressible fluid-chamber and is connected by means of a tube 43 to a pressure gauge 44 which measures the pressure of a fluid therein. The other end plate 45 of the member 42 carries a thrust-transmitting means generally indicated at 46. The means 46 comprises two parallel rods 47 joining a plate 48 with a plate 49. The plate 48 carries a pressure block 50 adapted to pass through a hole in the casing 10 and abut one end of a rod 51 carrying at its other end an indentor as will hereinafter be described, whilst the plate 49 is attached to the end plate 45 by means of a screw 52.

The rod 51 is loosely mounted in a guide tube 53 for sliding movement relatively thereto in the direction of its long axis, and the guide tube is carried on a turret plate 54 pivoted, as at 55, to the casing 10 on the outside thereof. The guide tube 53 has a pair of oppositely disposed longitudinal slots 56 formed in its inner wall which slots extend substantially parallel with the long axis of the rod 51. The rod has a transverse pivot pin 57 which passes diametrically through the rod and has its ends fitting with clearance in the slots 56 whereby the rod is capable of axial sliding movement as referred to above, and also limited pivotal movements relatively to the guide tube 53 about the pin 57. It is to be understood that since the rod 51 is capable of limited pivotal movement relatively to the guide tube 53 the angular relationship between the direction of the slots 56 and the long axis of the rod is variable within the limits of pivotal movement of the rod, and the term substantially parallel is to include these small variations.

An open coiled compression spring 58 is mounted on the rod 51 between the pin 57 and a lip 59 at the free end of the tube 53 and supports the rod 51 in the guide tube 53.

The rod 51 has mounted on its end a diamond pyramid or indentor 16 a base diagonal of the pyramid being parallel with the pin 57 so that a diagonal of the indentation produced in a test surface lies along the line of measurement of the optical measuring device hereinafter described. The other end of the rod is headed as at 60, and the head of the rod is recessed as at 61.

In order to bring the indentor to its operative position the turret plate is swung round so that the rod 51 is aligned with the block 50. The knob 11 is then screwed down until the head of a screw 62, which attaches the block 50 to the plate 48, is received in the recess 61 in the head 60 of the rod to ensure correct alignment and thereafter until the pin 57 is clear of the ends 31 of the slots 56. In this position the spring 58 holds the rod against the block 50 and an electric circuit, as will hereinafter be described, is completed to light a lamp 70 thus indicating that the indentor 16 is a predetermined small amount away from the test surface, at which the instrument is ready for making an indentation.

The size of the indentation is measured by means of a travelling microscope generally indicated at 12 (see Figure 1) carried mainly within the casing 10 but having an eye-piece 62 on the outside thereof, and an objective 63 mounted on the turret plate 54 so that it can be swung over the indentation.

By means of the foregoing construction, if when the turret plate is swung round the rod 51 to its operative position the guide tube 53 is slightly misaligned with the axis of thrust of the thrust-producing means the rod may accommodate itself within the tube by pivotal movement about the pin 57 such that the thrust is applied axially thereof.

By avoiding the possibility of a non-axial thrust there can be no increased frictional drag of the rod in the guide tube due to components of the thrust acting at right angles to its direction of movement thereby reducing the thrust as measured by the gauge with which the indentor is applied to the test surface. Furthermore, friction forces between the rod and the guide tube are kept very small because of the small bearing area of the pin 57 in the slots 56.

The lamp 70 is in circuit with insulated contacts 71 and 72. Contact 72 is fixed, and is carried from the casing 10. Contact 71 is mounted on a spring loaded pin 73 carrying a compression spring 79 movable axially in a direction parallel with the direction of movement of the thrust transmitting means, and the pin 73 is mounted to slide in an arm 74 carried by the end plate 41 of member 42. The pin 73 is retained in the arm 74 by a cross pin 76 with the spring 79 bearing on the arm 74 and the back of the contact 71. When the instrument is set for performing an indenting operation as referred to above and the contacts 71, 72 have closed gauge 44 is set to a zero reading, and the knob 11 screwed down to bring the indentor against the test surface and to compress the member 42 thus transmitting a thrust to the indentor 16, until the gauge indicates that the predetermined thrust has been applied to the indentor 16. The block 50 is then retracted, and the turret plate 54 swung round to bring the objective 63 over the indentation and the size of the indentation is measured by the microscope 12.

I claim:

1. An indentor thrust assembly for a hardness testing instrument comprising a frame, a guide tube supported from said frame, a rod loosely mounted within said guide tube for sliding movement therein in the direction of its long axis, a pin-and-slot connection between the rod and the guide tube, the slot element of said pin and slot connection being substantially parallel with the long axis of said rod, said connection allowing of said sliding movement and also enabling the rod to perform limited pivotal movements relatively to the guide tube about said pin in the plane of the long axis of the rod, an indentor mounted on one end face of the rod, a thrust producing means carried by said frame, and means abutting the other end face of said rod, to transmit the thrust from said thrust producing means to said rod.

2. An indentor thrust assembly for a hardness testing instrument comprising a frame, a guide tube supported from said frame, a rod loosely mounted within said guide tube for sliding movement therein in the direction of the long axis of the rod, a pivot-pin carried by said rod transversely thereof between its ends and projecting on each side of the rod, the ends of said pin being received in oppositely disposed slots in the wall of said guide tube, said slots extending substantially parallel with the long axis of said rod, said pin-and-slot connections allowing of said sliding movement, and also allowing the rod to perform limited pivotal movements relatively to said guide tube about said pin in the plane of its long axis, an indentor mounted on one end face of the rod, a thrust producing means carried by said frame, and means abutting the other end face of said rod, to transmit the thrust from said thrust producing means to said rod.

3. An indentor thrust assembly as claimed in claim 2 wherein the indentor is a diamond pyramid and the pivot pin is parallel with a base diagonal thereof.

4. An indentor thrust assembly for a hardness testing instrument comprising a frame, a guide tube supported from said frame, a rod loosely mounted within said guide tube for sliding movement therein in the direction of its long axis, a pin-and-slot connection between the rod and the guide tube, the slot element of said pin-and-slot connection being substantially parallel with the long axis of said rod, said connection allowing of said movement and also enabling the rod to perform limited pivotal movements relatively to the guide tube about said pin in the plane of the long axis of the rod, an indentor mounted on one end face of the rod, a rotary threaded spindle, a threaded female element carried by said frame and cooperating with said spindle whereby rotation of the spindle produces axial adjustment thereof, a compressible fluid chamber, coupling means between one end of said chamber and an end of said spindle, said means including a thrust bearing unit, a pressure plate carried by the opposite end of the compressible fluid chamber, said plate abutting the other end face of said rod, a pressure gauge carried by said frame and pipe means connecting said gauge with the interior of said fluid chamber.

JAMES KITCHENER POCKNEE.

References Cited in the file of this patent
UNITED STATES PATENTS

| Number | Name | Date |
|---|---|---|
| 2,422,634 | Riepert et al. | June 17, 1947 |

FOREIGN PATENTS

| Number | Country | Date |
|---|---|---|
| 606,061 | Great Britain | Aug. 5, 1948 |